United States Patent [19]

Messersmith et al.

[11] Patent Number: 4,660,691

[45] Date of Patent: Apr. 28, 1987

[54] VEHICULAR HILL HOLDER SYSTEM HAVING A CONTROL CIRCUIT RESPONSIVE TO VEHICULAR ATTITUDE, CLUTCH POSITION, AND GEAR POSITION

[75] Inventors: William K. Messersmith, South Bend; Keith H. Fulmer, Mishawaka, both of Ind.

[73] Assignee: Allied Corporation, Morristown, N.J.

[21] Appl. No.: 729,392

[22] Filed: May 1, 1985

[51] Int. Cl.⁴ ............................................. B60K 41/24
[52] U.S. Cl. ................................. 192/3 H; 192/0.049; 192/13 A
[58] Field of Search .................... 192/3 H, 3 TR, 3 T, 192/4 A, 3 N, 0.094, 13 A, 0.049; 303/24 A, 89; 91/32, 376 R

[56] References Cited

U.S. PATENT DOCUMENTS

| | | | |
|---|---|---|---|
| 2,197,721 | 4/1940 | Goepfrich | 192/01 |
| 2,262,842 | 11/1941 | Goepfrich | 192/13 A X |
| 2,594,155 | 4/1952 | Guernsey et al. | 188/152 |
| 3,023,053 | 2/1962 | Hager | 303/7 |
| 3,237,526 | 3/1966 | Hayes et al. | 91/376 |
| 3,364,818 | 1/1968 | Hager et al. | 91/24 |
| 3,498,426 | 3/1970 | Nakano | 192/13 A |
| 3,632,176 | 1/1972 | Gaeke | 303/21 A |
| 3,780,620 | 12/1973 | Gardner | 91/6 |
| 3,871,497 | 3/1975 | Bessiere | 192/3 TR |
| 3,880,049 | 4/1975 | Grabb et al. | 91/33 |
| 3,921,501 | 11/1975 | Rosback | 91/376 R X |
| 4,499,812 | 2/1985 | Pressaco et al. | 91/376 R |
| 4,515,259 | 5/1985 | Ha | 192/3 H |

FOREIGN PATENT DOCUMENTS

| | | | |
|---|---|---|---|
| 573144 | 3/1959 | Canada . | |
| 2144187 | 2/1985 | United Kingdom | 192/13 A |

Primary Examiner—George H. Krizmanich
Attorney, Agent, or Firm—Larry J. Palguta; Ken C. Decker

[57] ABSTRACT

A brake booster (10, 210) connected to a control circuit (120) provides a system for the continued braking of a vehicle when the vehicle is situated on an incline and the brake pedal (92) is released by the operator. Continued brake application is accomplished by utilizing a control circuit (120) responsive to vehicular attitude, clutch pedal position, and vehicular direction. The control circuit (120) is connected to the combination of a check valve and two-way solenoid valve (100, 200) connected to a movable wall brake booster (10, 210). The combination valve (100) is connected to a flexible hose (110) disposed interiorily of the booster (10), and the other end of the flexible hose (110) connected to the input opening (32) of a three-way poppet valve (70) located at the central hub (30) of the booster (10). When the control circuit (120) senses that the vehicle is on an incline, the clutch pedal depressed, the ignition "on", and the vehicle not backing up, it actuates the two-way solenoid of valve (100) which continues to supply a first fluid pressure to the front booster chamber (40) while closing to prevent the supply of the first fluid pressure to the rear booster chamber (50) via the flexible hose (110) and poppet valve (70). The vehicle operator may release the brake pedal (92) which returns slightly toward an inactive position and which opens slightly valve (70), with the brakes remaining activated because the second fluid pressure is maintained in the rear chamber (50) by the closed valve (100) so that the second fluid pressure may not escape via hose and connection (110) and valve (70), and thereby maintaining the axially displaced position of the movable wall (24).

12 Claims, 5 Drawing Figures

VEHICULAR HILL HOLDER SYSTEM HAVING A CONTROL CIRCUIT RESPONSIVE TO VEHICULAR ATTITUDE, CLUTCH POSITION, AND GEAR POSITION

The present invention relates to a vehicular hill holder system which includes a control circuit and a booster operable by either vacuum pressure or compressed air.

Car manufacturers are attempting to provide an economical solution for a long-standing problem with manual shift vehicles: how to permit the vehicle operator to manipulate the clutch pedal, brake pedal, accelerator pedal, and shift the gear lever when the vehicle is stationary on an incline. Such inclines are common at railroad crossings and in rural and metropolitan areas.

A solution to this problem is provided by mechanical roll-back lock devices that effect the mechanical lockup of the brake pedal through mechanical mechanisms connected to the brake and clutch pedals. However, such devices occupy additional cab space and require assembly and installation costs that are an add-on to the vehicle cost.

Vehicular hill holders systems have been provided in co-pending patent application Ser. Nos. 642,618 and 642,619, both filed on Aug. 20, 1984, which disclose embodiments of brake boosters and a control system to be utilized therewith for maintaining the braking of an automobile when it is on an incline, by means of maintaining the actuation of a vacuum or compressed air brake booster responsive thereto. These co-pending patent applications disclose a sophisticated control system responsive to numerous vehicular parameters. However, it would be preferable to provide a more simplified and easily constructed vehicular hill holder system which utilizes fewer parts, a simpler control circuit, and which is easier to assemble and install.

It is an object of the present invention to provide an inexpensive, practical vehicular hill holder system which utilizes presently existing equipment on manual shift vehicles. It is desirable that such a system may be included as either optional or original equipment on a manual shift vehicle, without requiring significant modification of the vehicle's equipment or any significant increase in cost.

The present invention comprises a vehicular hill holder system which utilizes presently existing booster equipment. A brake booster constructed in accordance with the present invention is connected to a control circuit which provides for continued braking of a vehicle when the vehicle is situated on an incline and the brake pedal released by the vehicle operator. Continued braking of the vehicle is accomplished by a control circuit responsive to vehicular attitude, clutch position, ignition status, and vehicular direction. The control circuit is connected to the combination of a check valve and two-way solenoid valve connected with the casing of a movable wall brake booster. The check valve and two-way solenoid valve are connected to a flexible hose disposed interiorally of the casing, the other end of the flexible hose being connected to the input opening of a three-way valve located at the center hub of the brake booster. When the control circuit senses that the vehicle is on an incline, the clutch pedal depressed, the ignition "on", and that the vehicle is not backing up, it actuates the two-way solenoid valve which permits the continued supply of a first fluid pressure to the front booster chamber while maintaining a second fluid pressure previously supplied to the rear booster chamber via the three-way valve. The vehicle operator may release his foot from the brake pedal and the brakes remain activated because of the second fluid pressure maintained in the rear chamber in order to retain the axially displaced position of the movable wall. An alternative embodiment which maintains the displaced position of the movable wall includes the use of a centrally disposed bellows.

The invention is described in detail below with reference to the drawings which illustrate various embodiments of the invention, in which.

Figure 1:
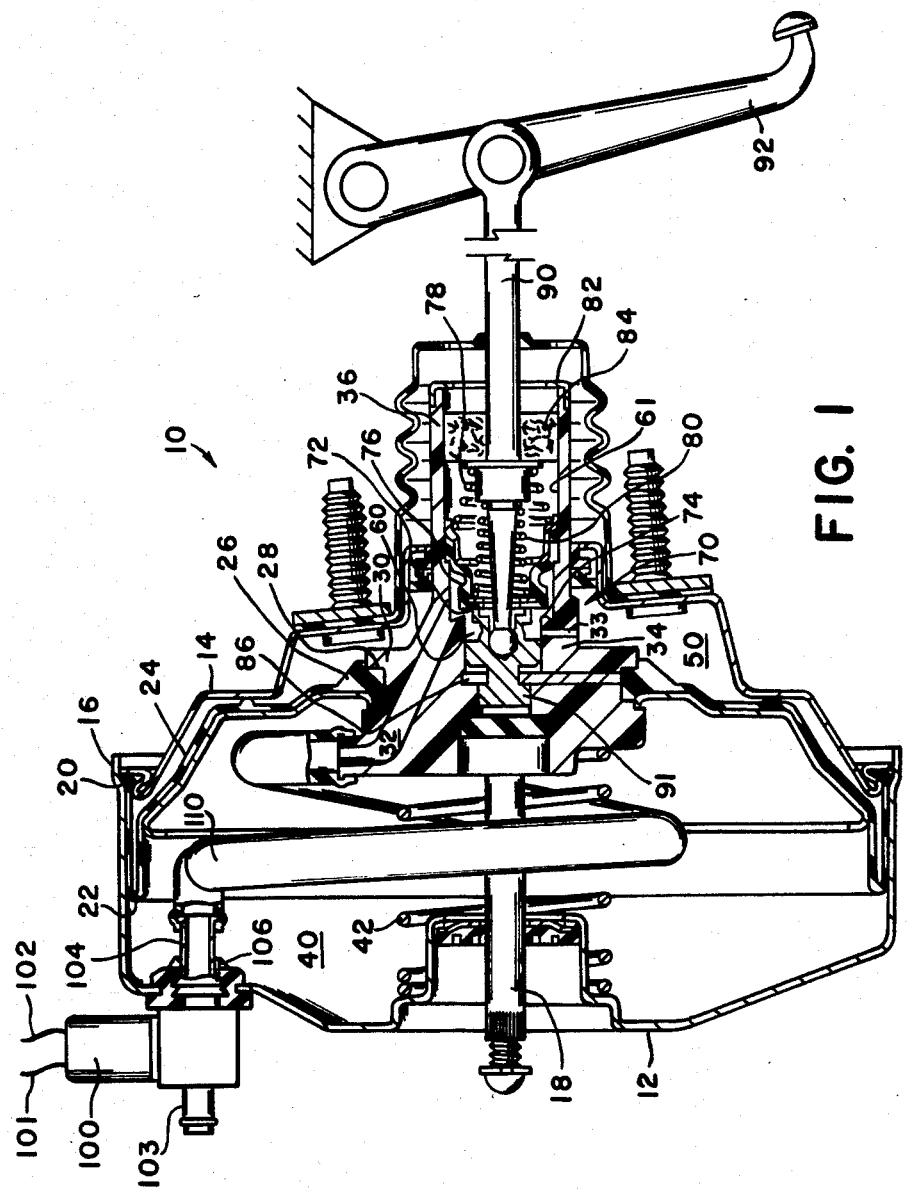
FIG. 1 is a cross-section view of a brake booster constructed in accordance with the present invention.

Referring to FIG. 1, there is illustrated a servomotor or brake booster 10 of the present invention. It should be clearly understood that the brake boosters or servomotors utilized in the present invention may take many different forms of conventional brake boosters being manufactured today. Only slight modification is required in order for a booster unit to be used in the present invention, and almost any conventional vacuum or compressed air booster unit may be utilized. Thus, the brake booster vehicular hill holder provides a low-cost, inexpensively manufactured unit because many of the present-day brake booster units may be utilized.

The booster 10 comprises a front shell 12 and a rear shell 14 which are attached together at rim portion 16. A master cylinder (not shown) would be attached to the booster 10, and provide an actuating means for operating the brakes of the vehicle when the master cylinder is actuated by the output or actuating rod 18. The front and rear shells 12, 14 are attached together at connection section 16 so as to trap the external bead 20 of the flexible diaphragm 22. Flexible diaphragm 22 is secured to movable wall 24 within the interior of the servomotor or booster unit 10. Diaphragm 22 terminates radially inwardly in an internal bead 26 received within a groove 28 of the central hub 30.

Diaphragm 22 of movable wall 24 divides booster unit 10 into a first or front chamber 40 and a second or working chamber 50. Disposed within front chamber 40 is a return spring 42 having one end mounted against front shell 12 and the other end engaging the central hub 30. Central hub 30 includes a first passage 32 which, in conventional booster units, provides communication between front chamber 40 and internal bore 60. Central hub 30 also includes a body portion 34 which extends rearwardly to form the rearward projection 36 and bore 61. Bore 60 extends toward rearward projection 36, and disposed in bore 60 is a first value means comprising a standard poppet valve 70. Body portion 34 includes a second passage 33 providing communication between rear chamber 50 and bore 60. Valve 70 comprises a conventional and well-known poppet valve structure utilized in many different booster embodiments and applications. Included within valve 70 is a first valve seat 72, plunger 91, second valve seat 74, poppet member 76, first spring 78, second spring 80, rear opening 82, filter 84, and a key 86. Extending through bore 60 and operatively coupled to valve 70, is an input rod 90 operatively coupled to the vehicle's brake pedal 92. The operation of valve 70 is conventional in performance.

Figure 3:
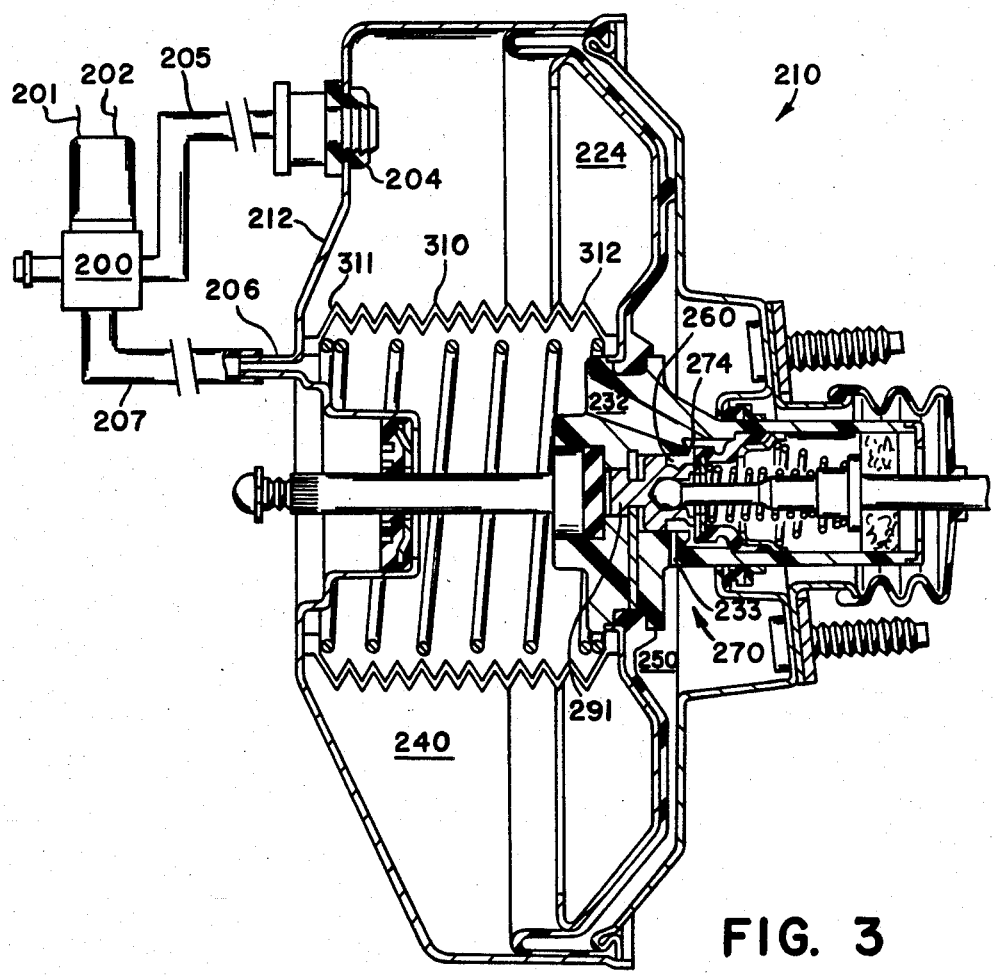
FIG. 3 is a cross-section view of an alternative embodiment of a brake booster utilized in the present invention.
Figure 4:
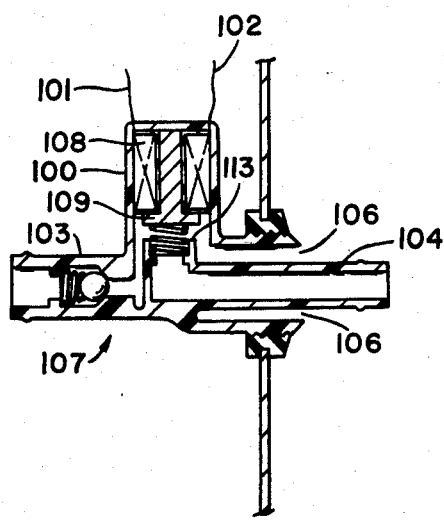
FIGS. 4 and 5 illustrate combination valves associated with the brake boosters of FIGS. 1 and 3.

Modification of booster unit 10 is provided by control valve means or combination valve 100 mounted to front shell 12. Combination valve 100 is a second valve means mounted to the front shell 12 purely as a matter of convenience; valve 100 may be mounted at various other locations within the vehicle and need not be mounted directly to the front shell. Combination valve 100 comprises the combination of a check valve and two-way solenoid valve, as illustrated by the embodiments in FIGS. 1 and 3. The solenoid valve is connected by wires 101, 102 to the control circuit illustrated in FIG. 2 and which will be explained hereinafter. Valve 100 has an input connection 104 extending through shell 12 into the interior of front chamber 40. Located about connection 104 are spaced-apart circumferential passages 106. Connection 104 is coupled to the end of a flexible hose or conduit 110 which is coiled within front chamber 40 and has the other end coupled to central hub 30 to cover the outlet opening of first passage 32. Referring to FIG. 4, valve 100 comprises a coil 108, spring biased armature 109, valve seat 113, and check valve 107 of extension 103 connected to a vacuum source. Energization of coil 108 effects displacement of armature 109 which closes valve seat 113. The vacuum source continues to be connected with first chamber 40 by way of extension 103, check valve 107 and passages 106, while connection 104 and conduit 110 are isolated from the vacuum source by closed valve seat 113.

As can be seen from the above description, a conventional brake booster unit or servo motor may be modified for use in the present invention by means of a flexible connection providing communication between a combination check valve and two-way solenoid valve and the front chamber input opening of the central hub passage communicating with the poppet valve. Other alternative embodiments can provide the same functions accomplished by the above unit, and such other structures are contemplated as being within the scope of the present invention. An example alternative embodiment illustrating how a booster unit may be modified in order to operate in accordance with the present invention, is illustrated in FIG. 3 which will be described in detail.

Figure 2:
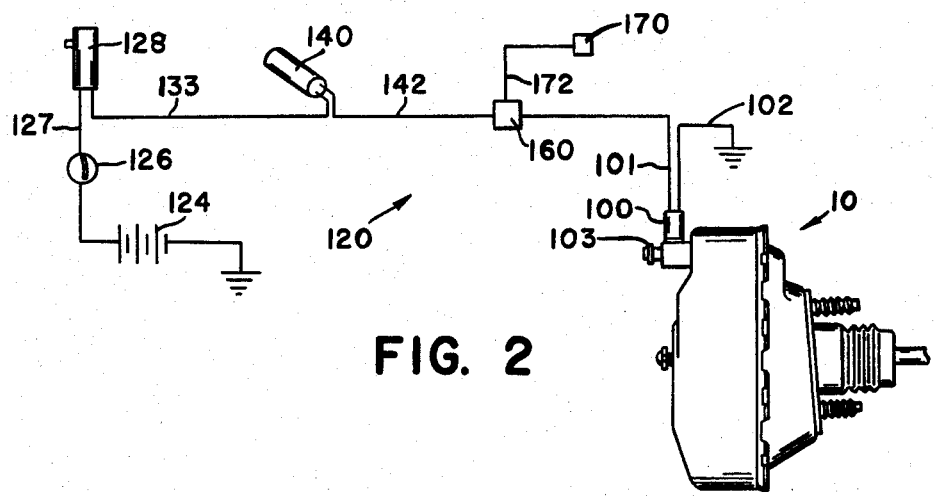
FIG. 2 is a schematic representation of the brake booster of FIG. 1 and the control circuit connected thereto.

Referring to FIG. 2, there is illustrated a control circuit 120 utilized with the present invention. The vehicle's battery 124 is connected to ignition switch 126 coupled by wire 127 to clutch pedal switch 128. Clutch pedal switch 128 provides an input in accordance with the position of the clutch. If the clutch pedal is depressed or "in", such that the vehicle is not in gear, then clutch pedal switch 128 provides an output through line 133 connected in series with a vehicle attitude switch 140. However, if the clutch pedal switch is released such that the vehicle may be "in gear" or in neutral, then clutch pedal switch 128 opens the circuit and does not provide an output through line 133. Vehicle attitude switch 140 may comprise any type of conventional mercury level switch or other device which will provide a switch closure when the vehicle is situated at a predetermined angle. Line 142 connects attitude switch 140 with the vehicle back-up light switch 170 that provides an electrical output through line 172 so that if the vehicle is backing up, a signal is relayed via line 172 to main switch 160 whereby an operative output signal is not permitted by main switch 160. In other words, back-up light switch 170 provides a "defeat" instruction to switch 160.

Circuit 120 operates in response to certain predetermined vehicular parameters in order to determine if combination valve 100 should operate and maintain braking of the vehicle so that vehicle operator may release the brake pedal without effecting release of the vehicle brakes. A vehicular brake hill holder system finds use in cities that are very hilly, rural areas, and at railroad track crossings which typically include inclines. Many vehicle operators have experienced difficulty in keeping a manual shift vehicle from rolling backwards on an incline, because of the necessary simultaneous operation of the clutch pedal, brake pedal, shifting of the gear lever, and operation of the accelerator pedal when the operator is ready to accelerate the vehicle. The present invention provides a practical solution to this problem by providing a vehicular hill holder for manual shift vehicles which may have brake booster units. The brake booster units may be either conventional vacuum brake boosters or conventional compressed air brake boosters, both types being easily modified for use in the present invention.

OPERATION

The extension 103 of combination valve 100 is coupled to the engine's intake manifold. Vacuum is provided to the valve 100 which communicates the vacuum via circumferential passages 106 to the front chamber 40 of booster 10, and via input connection 104 to conduit 110 and passage 32 in central hub 30. Passage 32 communicates via vacuum through second valve seat 74 to central bore 60 and through second passage 33 to rear chamber 50. When the vehicle's operator depresses brake pedal 92, input rod 90 displaces plunger 91 so that second valve seat 74 is closed and vacuum no longer communicated to chamber 50 via passage 32, central bore 60, and second passage 33. Further displacement of rod 90 and plunger 91 open first valve seat 72 so that atmosphere may enter rear chamber 50. Atmosphere enters rear chamber 50 through rear opening 82, filter 84, bore 61, open first valve seat 72, bore 60, and passage 33. The introduction of atmospheric pressure into rear chamber 50 and the continued provision of vacuum within front chamber 40 effects a displacement of movable wall 24 which displaces actuating rod 18 to operate the master cylinder (not shown) and effect braking of the vehicle. So far, operation of the brake booster unit is in accordance with a conventional brake booster unit. Referring to FIG. 2, if the vehicle's ignition is "on" so that ignition switch 126 is closed, and the clutch pedal has been depressed inwardly so that the vehicle is not "in gear", then clutch pedal switch 128 provides an electrical output through line 133 to vehicle attitude switch 140. If the vehicle is in an inclined position, i.e., equaling or exceeding a certain predetermined angular position caused by an incline on which the vehicle is situated, then the vehicle attitude switch is closed and permits an electrical output through line 142 to main switch 160. As an additional feature which precludes the possibility of the vehicle being in reverse and backing down an incline so that the brakes would stay applied when the clutch pedal is depressed, back-up light switch 170 is provided with an input to switch 160. If the vehicle is not in reverse gear for moving backwards, then no output is provided by back-up light switch 170 through line 172 to switch 160, and this defeat instruction is not present. Switch 160 permits a continual electrical output through line 101 to combination valve 100. Upon receiving an activation signal through line 101, the two-way solenoid valve of valve 100 is activated so that vacuum continues to be provided via circumferential passages 106 to front chamber 40, but the valve 100 closes so that vacuum cannot be supplied through connection 104 to conduit 110 in order to permit retraction or return of the movable wall 24. This also operates to maintain the atmospheric pressure presently existing in rear chamber 50, so that this pressure is held within the chamber. Thus, when the vehicle operator removes his foot from the brake pedal, brake input rod 90 and plunger 91 are permitted to retract toward their initial rest position and retract plunger 91 to its initial position, by means of the springs 42, 78 and 80. This allows first valve seat 72 to close and valve seat 74 to be opened in a position similar to that shown for seats 72, 74 in FIG. 1. In a conventional booster unit, at this point in operation, vacuum pressure would have been communicated via passage 32 to central bore 60, second passage 33, and rear chamber 50 in order to effect the return of movable wall 24. However, in this case atmospheric pressure is maintained in the rear chamber 50 via conduit 110, passage 32, slightly open second valve seat 74, central bore 60, and second passage 33. Because the atmospheric pressure is maintained and cannot escape through passage 33 because valve 100 is closed, the brakes of the vehicle remain activated, allowing the operator to remove completely his foot from the brake pedal. Maintaining the atmospheric pressure in the rear chamber or in the case of compressed air vacuum boosters, a second higher fluid pressure, insures that movable wall 24 remains in its activated position which effects continued actuation of the master cylinder and braking of the vehicle.

Referring again to FIG. 2, when the vehicular operator decides to accelerate the vehicle by shifting the gear lever, releasing the clutch pedal and depressing the accelerator pedal, the release of the clutch pedal opens clutch pedal switch 128 to terminate the electrical signal communicated through lines 133, 142, and 101 to two-way solenoid valve of combination valve 100. The opening of this portion of circuit 120 permits the solenoid valve to return to its initial inactive position wherein vacuum is communicated again via connection 104, hose 110, passage 32, slightly open second valve seat 74, and central bore 60 to second passage 33 and rear chamber 50. Thus, deactivation of the two-way solenoid valve operatively effects deactivation of the brakes as movable wall 24 returns toward its initial at-rest position. The cessation of the supply of atmospheric pressure to rear chamber 50 permits movable wall 24 to retract under the force of spring 42, toward an inactive position which results in a full return of poppet valve 70 to the position illustrated in FIG. 1.

As follows from the detailed description above, the present invention provides a vehicular hill holder system in the form of a control circuit and a power brake booster unit that remains in an activated position in order to provide continued braking of the vehicle, when certain predetermined parameters are present. These parameters include the clutch pedal position, vehicular attitude, and direction of movement, if any, of the vehicle. When the various parameters are present, control circuit 120 provides an electrical signal to effect operation of combination valve 100 and operatively maintain the displaced position of the movable wall 24 and activation of the brakes.

A significant advantage of the present invention is that it provides for a very simplified, easily manufactured and installed vehicular hill holder system. The control circuit and combination valve 100 are reduced to the minimum components and parts, and are easily added to existing brake booster units. Additionally, the vehicular hill holder system of the present invention provides a system that maintains the braking pressure applied by the driver, and the pressure differential effected in the brake booster unit can never be greater than that applied by the driver. Thus, the vehicular hill holder system cannot be applied without the driver stepping on the brake pedal and then it can only effect a corresponding braking pressure in accordance with the driver input through the brake pedal.

Figure 5:
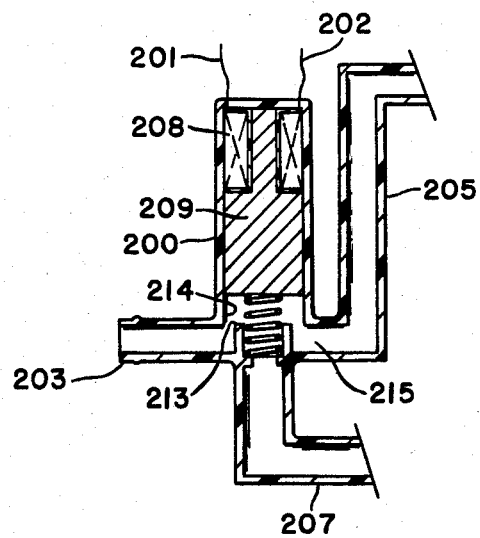

FIG. 3 illustrates an alternative brake booster embodiment. A booster unit 210 includes a flexible bellows 310 at a central area thereof, one end 311 of the bellows being connected to the front shell 212 and the other end 312 connected to movable wall 224. Check valve connection 204 enables vacuum to be continuously communicated to front chamber 240, and connection 206 provides for communication of vacuum to the interior of bellows 310. The valve 200 (two-way solenoid valve) is coupled to previously described control circuit 120 so that when the control circuit operates in accordance with the above-described conditions, an electrical signal effects operation of valve 200. Operation of valve 200 terminates the communication of vacuum via connections 207, 206 and maintains the atmospheric pressure present in rear chamber 250 after the operator has removed his foot from the brake pedal so that second valve seat 274 is slightly open. Referring to FIG. 5, valve 200 comprises an extension 203, coil 208, spring biased armature 209, and valve seat 213. Energization of coil 208 displaces armature 209 which closes valve seat 213. A vacuum source connected with extension 203 continues to communicate with check valve connection 204. Valve seat 213 has a smaller outer diameter than the diameter of valve bore 214 so that when armature 209 closes, the vacuum source is isolated from connection 207 but communicates around seat 213 to passage 215 and connections 205, 204. Thus, booster unit 210 operates in essentially the same manner as the booster unit illustrated in FIG. 1, although unit 210 utilizes a bellows 310 to provide an alternative means for maintaining the atmospheric pressure provided to rear chamber 250 by means of poppet valve 270.

Although this invention has been described in connection with the illustrated embodiments, it will be obvious to those skilled in the art that various changes may be made in the form, structure, and arrangement of the parts without departing from the invention.

We claim:

1. A brake booster-assisted braking system operable on an incline to maintain braking of a vehicle when a brake pedal released by the vehicle operator, comprising a casing having a valve disposed within the casing adjacent one end of the casing and actuated by an operatively connected brake pedal, actuating rod means engaging the valve and extending through the other end of the casing to operatively engage brake actuator means, a movable wall dividing the casing into a first chamber and a second chamber and acting on said actuating rod means, control valve means for communicating a fluid pressure to the interior of said casing, connection means for connecting said control valve means with said valve, and control circuit means for sensing vehicular parameters and connected to said control valve means, displacement of the operatively connected brake pedal causing actuation of said valve to terminate the communication of a first fluid pressure from said control valve means to said second chamber via the connection means and valve and providing a second fluid pressure to the second chamber to effect a pressure differential between the chambers which causes displacement of said movable wall and actuating rod means to operate the brake actuator means and effect braking of the vehicle, the control circuit means sensing the parameters of vehicular attitude and clutch position and responsively thereto actuating the control valve means which closes to maintain the second fluid pressure in the second chamber via the connection means and valve and maintain the braking of the vehicle upon release of the brake pedal which deactivates the valve, and said control valve means comprising the combination of a check valve and two-way solenoid valve means operating responsively to signals from said control circuit means, operation of the two-way solenoid valve means effecting a continuous supply of the first fluid pressure to the first chamber and closing to contain said second fluid pressure in the second chamber via the connection means and valve.

2. The brake booster-assisted braking system according to claim 1, wherein the control circuit means operates responsively to switching means for determining if the vehicle is in reverse gear.

3. The brake booster-assisted braking system according to claim 2, wherein the connection means comprises a flexible tube having one end connected to said control valve means and the other end connected to said valve.

4. The brake booster-assisted braking system according to claim 1, wherein said connection means is disposed interiorily of said casing.

5. The brake booster-assisted braking system according to claim 2, wherein the brake booster comprises a vacuum brake booster with the first fluid pressure providing vacuum and the second fluid pressure comprising atmospheric pressure.

6. A process for maintaining actuation of a vehicular braking assistance servo motor when the vehicle is situated on an incline, comprising the steps of: (a) coupling first valve means with a casing of a servo motor and in operative connection with an input rod, an output rod, and a movable wall assembly dividing the casing into chambers, (b) locating second valve means for communication with a first chamber of said chambers, the second valve means comprising a check valve and two-way solenoid valve means, (c) connecting means for communication to said second valve means and said first valve means, (d) coupling control circuit means with said second valve means, the control circuit means operating responsively to the parameters of vehicular attitude and clutch position, (e) supplying a first fluid pressure to said second valve means for joint communication of the first fluid pressure to the first chamber and to a second chamber of said chambers, the second chamber receiving said first fluid pressure via the communication means and first valve means, (f) displacing said input rod to actuate said first valve means which terminates the supply of said first fluid pressure to the second chamber and provides a second fluid pressure to the second chamber, and thereby effecting displacement of said movable wall assembly and output rod, (h) and maintaining the displaced position of said movable wall assembly when said vehicle is stationary on an incline, by actuating the second valve means responsively to said control circuit means in order to prevent the second fluid pressure in the second chamber from escaping through the first valve means and communication means upon deactuation of said first valve means, the actuated second valve means effecting containment of said second fluid pressure in the second chamber until deactuation of the second valve means.

7. The process in accordance with claim 6, further comprising the step of disposing said communication means interiorily of said casing.

8. The process in accordance with claim 6, further comprising the step of ceasing maintenance of said displaced position of the movable wall assembly by deactuating the second valve means responsively to the parameters of vehicular attitude and clutch position as sensed by the control circuit means, the deactuated second valve means permitting evacuation of said second fluid pressure from the second chamber.

9. A process for maintaining actuation of a vehicular braking assistance servo motor when the vehicle is situated on an incline, comprising the steps of: (a) coupling first valve means with a casing of a servo motor and in operative connection with an input rod, an output rod, and a movable wall assembly dividing the casing into chambers, (b) locating second valve means for communication with said servo motor, the second valve means comprising the combination of a check valve and two-way solenoid valve means, (c) coupling control circuit means with said second valve means, the control circuit means operating responsively to the parameters of vehicular attitude and clutch position, (d) displacing said input rod to actuate said first valve means which provides pressure to a working chamber of said chambers and effects displacement of said movable wall assembly and output rod by means of a pressure differential between the chambers, and (e) maintaining the displaced position of said movable wall assembly when said vehicle is stationary on an incline and the first valve means deactuated, by actuating the second valve means responsively to said control circuit means in order to maintain a pressure differential between the chambers by preventing escape of the pressure from the working chamber through said second valve means, the actuated second valve means having activated the two-way solenoid valve means that contains the pressure in the working chamber until deactuation of the second valve means.

10. The process in accordance with claim 9, further comprising the step of disposing interiorily of the casing communication means for transmitting fluid pressure from the second valve means to the first valve means.

11. The process in accordance with claim 9, further comprising the step of the second valve means evacuating continuously pressure from one of said chambers.

12. The process in accordance with claim 9, wherein the actuated second valve means prevents evacuation therethrough of said pressure.

* * * * *